(12) United States Patent
Hess et al.

(10) Patent No.: US 6,826,521 B1
(45) Date of Patent: Nov. 30, 2004

(54) SYSTEM AND METHODOLOGY AND ADAPTIVE, LINEAR MODEL PREDICTIVE CONTROL BASED ON RIGOROUS, NONLINEAR PROCESS MODEL

(75) Inventors: Todd M. Hess, Ashland, KY (US); Andreas Kroll, Heidelberg (DE); Carl-Fredrik S. M. Lindberg, Västerås (SE); Per Erik Modén, Västerås (SE); Mikael Petersson, Lund (SE); Kenneth L. Praprost, Chesterland, OH (US)

(73) Assignee: ABB Automation Inc., Wickliffe, OH (US)

( * ) Notice: Subject to any disclaimer, the term of this patent is extended or adjusted under 35 U.S.C. 154(b) by 0 days.

(21) Appl. No.: 09/544,390

(22) Filed: Apr. 6, 2000

(51) Int. Cl.[7] .................................................. G06G 7/48

(52) U.S. Cl. .............................. 703/12; 700/29; 700/38

(58) Field of Search .............................. 703/2, 12, 13; 700/29, 38, 44, 45; 702/56; 706/21

(56) References Cited

U.S. PATENT DOCUMENTS

| | | | | |
|---|---|---|---|---|
| 3,758,762 A | * | 9/1973 | Littman et al. | ................ 700/45 |
| 5,060,132 A | * | 10/1991 | Beller et al. | ................... 700/38 |
| 5,424,942 A | | 6/1995 | Dong et al. | |
| 5,488,561 A | | 1/1996 | Berkowitz et al. | |
| 5,519,605 A | | 5/1996 | Cawlfield | |
| 5,682,309 A | | 10/1997 | Bartusiak et al. | |
| 5,740,033 A | | 4/1998 | Wassick et al. | |
| 6,285,971 B1 | * | 9/2001 | Shah et al. | ...................... 703/2 |
| 6,381,505 B1 | * | 4/2002 | Kassmann et al. | ............. 700/44 |
| 6,445,963 B1 | * | 9/2002 | Blevins et al. | ................. 700/44 |
| 6,453,308 B1 | * | 9/2002 | Zhao et al. | .................... 706/21 |
| 6,542,782 B1 | * | 4/2003 | Lu | ............................... 700/29 |
| 6,549,858 B1 | * | 4/2003 | Shelley et al. | ................. 702/56 |

OTHER PUBLICATIONS

Zhao et al., "An identification approach to nonlinear state space model for industrial multivariable model predictive control", IEEE/AACC 1998.*

Aoyama et al., "Implementation issues in quadratic model predictive control", IEEE/AACC 1997.*

(List continued on next page.)

Primary Examiner—Kevin J. Teska
Assistant Examiner—Kandasamy Thangavelu
(74) Attorney, Agent, or Firm—Michael M. Rickin, Esq.

(57) ABSTRACT

A methodology for process modeling and control and the software system implementation of this methodology, which includes a rigorous, nonlinear process simulation model, the generation of appropriate linear models derived from the rigorous model, and an adaptive, linear model predictive controller (MPC) that utilizes the derived linear models. A state space, multivariable, model predictive controller (MPC) is the preferred choice for the MPC since the nonlinear simulation model is analytically translated into a set of linear state equations and thus simplifies the translation of the linearized simulation equations to the modeling format required by the controller. Various other MPC modeling forms such as transfer functions, impulse response coefficients, and step response coefficients may also be used. The methodology is very general in that any model predictive controller using one of the above modeling forms can be used as the controller. The methodology also includes various modules that improve reliability and performance. For example, there is a data pretreatment module used to preprocess the plant measurements for gross error detection. A data reconciliation and parameter estimation module is then used to correct for instrumentation errors and to adjust model parameters based on current operating conditions. The full-order state space model can be reduced by the order reduction module to obtain fewer states for the controller model. Automated MPC tuning is also provided to improve control performance.

10 Claims, 6 Drawing Sheets

OTHER PUBLICATIONS

M.Tvrzská De Gouvêa and D. Odloak, "ROSSMPC: A New Way of Representing and Analysing Predictive Controllers", Trans IChemE, vol. 75, Part A Oct. 1997; p. 693–708 Copyright 1997 Institution of Chemical Engineers.

Raman K. Mehra, Shah Mahmood & Joe Runkel, "Temperature Control of Hot Isostatic Pressing (HIP) Furnace Using Model Predictive and Risk Sensitive Optimal Controllers", IEEE, Sep. 28, 1995, p. 949–954, Copyright 1995 IEEE.

P. Vega, A. Cipriano, C. De Prada, J. Tancara, and M. Guarini, "Evaluation of Advanced Regulators For An Evaporation Station", IEEE, Jun. 26, 1994, p. 648–654, Copyright 1994 IEEE.

* cited by examiner

SYSTEM AND METHODOLOGY AND ADAPTIVE, LINEAR MODEL PREDICTIVE CONTROL BASED ON RIGOROUS, NONLINEAR PROCESS MODEL

FIELD OF THE INVENTION

This invention relates to the control of a multivariable, time-varying, industrial process that exhibits either linear or nonlinear response characteristics and more particularly the on-line execution of an adaptive, linear model predictive controller derived from a rigorous, nonlinear model of such processes.

DESCRIPTION OF THE PRIOR ART

There are many multivariable, time-varying, industrial processes that exhibit either linear or nonlinear response characteristics. Several examples of such processes are a distillation column, a separator train, a catalytic cracking unit, a chemical reactor, and a utility boiler. Control of these processes using traditional multivariable control techniques with fixed model representations is difficult because of the variable process conditions that result from either process nonlinearities, measured or unmeasured disturbances, feedstock changes, or operator-induced changes.

The standard practice for advanced industrial process control in processes of the type described above is to use linear, multivariable, model predictive controller (MPC) software. See for example, the Setpoint, Inc. product literature dated 1993 entitled "SMC-Idcom: A State-of-the-Art Multivariable Predictive Controller"; the DMC Corp. product literature dated 1994 entitled "DMC™: Technology Overview"; the Honeywell Inc. product literature dated 1995 entitled "RMPCT Concepts Reference"; and Garcia, C. E. and Morshedi, A. M. (1986), "Quadratic Programming Solution of Dynamic Matrix Control (QDMC)", Chem. Eng. Commun. 46: 73–87. The typical MPC software allows for model scheduling (i.e. changing the model gains and/or dynamics) to improve control performance when operating on a nonlinear and/or time-varying process. The controller uses new models that are generally calculated in an off-line mode, or may be calculated by an adaptive algorithm that uses recent operating data.

If the models are calculated off-line, then the controller requires additional on-line logic to determine which set of model parameters should be used at the current time. This logic is often difficult to develop since it may depend on numerous operating variables. For large problems there may be a significant number of different models required in order to improve performance. Furthermore, there is a possibility that invoking a particular set of model parameters for certain operating points will eventually lead to unstable operation. Thus, the off-line model identification task is extremely time-consuming and expensive and its implementation on-line is not proven robust over wide operating ranges. Therefore, in most applications a simplified set of models is defined (e.g. high feed rate and low feed rate models; or winter and summer operation models).

The control performance using a simplified set of models is not much better than what can be achieved using a single model. In fact, controllers developed using this methodology do not usually remain on-line for processes demonstrating a high degree of non-linearity.

Adaptive model identification is another way to modify linear models to capture current operating conditions. This procedure uses recent operating data to automatically adjust the models on-line. One of the biggest problems of this approach is inherent from the dual control principle, which essentially states that the uncertainty in model identification increases as the control performance improves (i.e. as the control uncertainty decreases). Thus, it is always much more difficult to obtain accurate new models when the controller is running since the input signals are correlated and the output signals have small deviations. In fact, the identification process often fails because of the loss of persistent excitation in the input signals. See Astrom, K. J. and Wittenmark, B. (1995) "Adaptive Control", Addison-Wesley Publishing Company, Inc., pp. 69–70 and 473–477, for a detailed discussion of this problem. This inherent mathematical problem limits the success of adaptive, linear model identification. Current algorithms use various methods to turn off or heavily filter the parameter changes in the adaptive identification. Otherwise, poor models could be selected because of the high model uncertainty and ultimately the control performance would suffer.

There are some types of industrial processes that cause additional problems for empirical model identification methods. For example, a batch process could operate with multiple product runs during which the model gains change by orders of magnitude (e.g. polyethylene, polypropylene processing), yet the batches may not reach equilibrium. Linear, empirical methods cannot obtain accurate models for such processes since the necessary operational data is not available.

Model identification problems also occur for processes that do not allow plant testing near dangerous or unstable operating conditions (e.g. catalytic cracking, reactors). Controllers for such processes try to prevent violation of constraint limits that could lead to unstable behavior, however the benefits often increase by operating closer to the limits. Therefore to improve performance and maximize benefits, the controller needs to have multiple models available for all the operating regions. This is not possible with linear, empirical methods. A rigorous, nonlinear process simulation model could, however, provide these multiple models for the controller.

The same type of model identification problems can occur for non-dangerous processes that have product specification limits (e.g. distillation columns). The plant manager does not want to generate off-spec product, so the testing must be conducted such that the purity remains within acceptable limits. However, greater benefits are typically obtained by operating closer to these limits. Thus, the empirical methods cannot generate accurate models for operating points that are close to or beyond the limits. High-purity separation processes present the most significant modeling problems as very nonlinear behavior may occur over the different operating regions.

Another disadvantage of empirical MPC identification methods occurs when the controller is used together with real-time optimization (RTO) since the models are not consistent. RTO generally uses a more rigorous, nonlinear model while MPC is either using a fixed linear model obtained from plant testing, or an adaptive, linear model obtained from on-line data. In either case, the MPC models are not derived from the RTO model (nor vice versa), so this inconsistency often leads to significant performance degradation. See for example the article by Y. Z. Friedman entitled "What's wrong with unit closed loop optimization?" which appeared in the October 1995 issue of Hydrocarbon Processing at pp. 107–116.

Another means of treating nonlinear, time-varying processes is to use robust control methods. The idea behind robust control is to use a single process model, but to tune the controller by accounting for modeling uncertainties. The control design is tested against a range of expected operating conditions and is retuned until the performance is fairly consistent (or robust) over all conditions. The robust tuning method reduces the sensitivity of the controller to model error. Honeywell has applied this technique to its RMPCT (Robust Multivariable Predictive Control Technology) product as described in the product literature referenced above.

However, there are some drawbacks to using robust control techniques. In particular, by restricting the controller to a single linear model, robust tuning often results in slow, sluggish control performance over the typical operating range because it attempts to improve the worst-case performance. Thus, the robust tuning often degrades performance during periods of small modeling error. This occurs because the expected range of modeling uncertainties is often too large for a single model and single set of tuning parameters. It is possible to vary the tuning, but this becomes a difficult on-line implementation task. The real solution is to allow multiple models for processes with significant nonlinearities and/or time-varying behavior.

The patent prior art includes many examples of the use of model-based control systems employing both linear and nonlinear methodologies for control. Most of the prior art in MPC refers to linear controllers [see for example, U.S. Pat. No. 4,349,869 to Prett et al.; U.S. Pat. No. 4,616,308 to Morshedi et al.; U.S. Pat. No. 5,351,184 to Lu et al.; and U.S. Pat. No. 5,572,420 to Lu]. To handle nonlinear, time-varying processes, these controllers may use gain scheduling, adaptive model estimation, or robust control tuning. These approaches typically encounter implementation problems and/or performance degradation for the types of processes and operating conditions described previously.

There have been a few patents issued for nonlinear model-based control methodologies. In particular, U.S. Pat. No. 5,260,865 to Beauford et al. describes a nonlinear model-based control strategy for a distillation process which employs a nonlinear model to compute liquid and vapor flow rates required for composition control. Sanner and Slotine (U.S. Pat. No. 5,268,834) employ a neural network together with other nonlinear control strategies to provide adaptive control of a plant. Bartusiak and Fontaine (U.S. Pat. No. 5,682,309) developed a reference synthesis technique in which the controller attempts to make a nonlinear plant follow a specified reference trajectory. U.S. Pat. No. 5,740,033 to Wassick et al. describes an MPC that employs a real-time executive sequencer and an interactive modeler to find the optimized set of control changes for a nonlinear process.

Large, nonlinear control problems are difficult to solve in an on-line operating environment. The solver must be fast and robust. It is unknown whether these inventions have been able to achieve successful implementations of on-line, nonlinear control.

SUMMARY OF THE INVENTION

The invention is a methodology for process modeling and control and the software system implementation of this methodology, which includes a rigorous, nonlinear process simulation model, the generation of appropriate linear models derived from the rigorous model, and an adaptive, linear model predictive controller that utilizes the derived linear models. A state space, multivariable, model predictive controller (MPC) is the preferred choice for the MPC since the nonlinear simulation model is analytically translated into a set of linear state equations. Thus, a state space MPC simplifies the translation of the linearized simulation equations to the modeling format required by the controller. However, the state space methodology also allows the calculation of various other MPC modeling forms such as transfer functions, impulse response coefficients, and step response coefficients. Therefore, the methodology is very general in that any model predictive controller using one of the above modeling forms can be used as the controller.

The methodology also includes various modules that improve reliability and performance. For example, there is a data pretreatment module used to pre-process the plant measurements for gross error detection. A data reconciliation and parameter estimation module is then used to correct for instrumentation errors and to adjust model parameters based on current operating conditions. The full-order state space model can be reduced by the order reduction module to obtain fewer states for the controller model. Automated MPC tuning is also provided to improve control performance.

The invention is also embodied as a method for controlling a process that comprises:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in said one or more of said updated submodel variables has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers;

h) converting said at least one linearized submodel to a full order state space submodel;

i) creating from said full order state space submodel a state space submodel having fewer states than said full order state space submodel;

j) converting said fewer states state space submodel to a MPC format submodel; and k) evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluations; or returning said MPC format submodel to said creating a MPC format submodel having fewer states than said full order state space submodel to change the number of states in said MPC format submodel when said performance of said MPC format submodel falls below said first predetermined limit.

The invention is also further embodied as a method for controlling a process that comprises:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in one or more model prediction errors in an associated one of one or more MPC format submodels currently operational in an associated one of said two or more model predictive controllers has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers; and h) converting said at least one linearized submodel to a full order state space submodel;

i) creating from said full order state space submodel a state space submodel having fewer states than said full order state space submodel;

j) converting said fewer states state space submodel to said MPC format submodel; and k) evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluations; or returning said MPC format submodel to said creating a MPC format submodel having fewer states than said full order state space submodel to change the number of states in said MPC format submodel when said performance of said MPC format submodel falls below said first predetermined limit.

The invention is also embodied further as a method for controlling a process that comprises:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in said one or more of said updated submodel variables has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers; and h) passing said linear model to said associated one of said two or more controllers comprising:

evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluating.

The invention is further embodied as a method for controlling a process that comprises:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in one or more model prediction errors in an associated one of one or more MPC format submodels currently operational in an associated one of said two or more model predictive controllers has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers; and h) passing said linear model to said associated one of said two or more controllers comprising:

evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluating.

DESCRIPTION OF THE PREFERRED EMBODIMENT(S)

Figure 1:
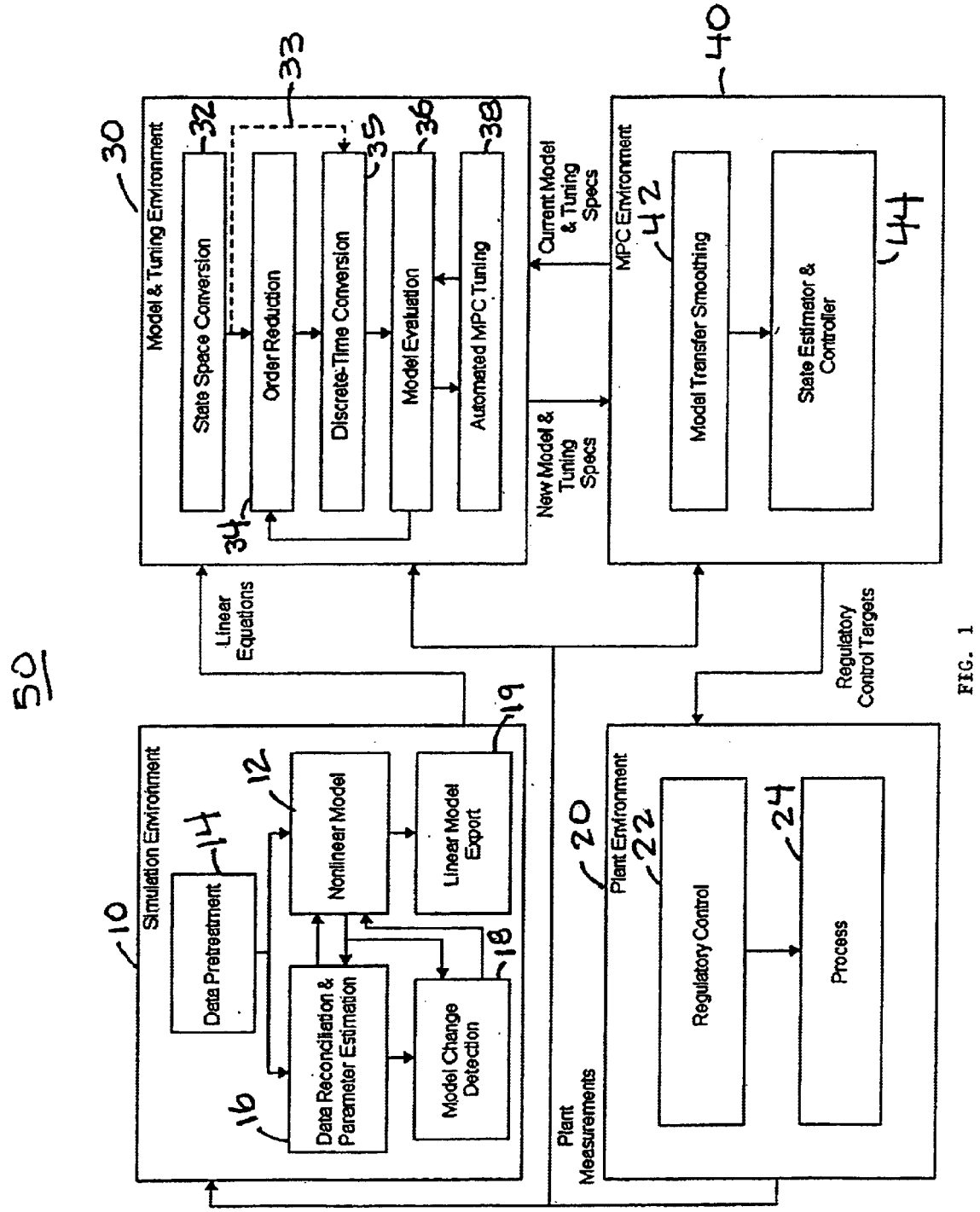
FIG. 1 shows in a block diagram form the various software components of the invention in the multiple operating environments and the data flow between components.

The embodiment of the complete computer software system 50 shown in FIG. 1 includes a number of different components operating in multiple environments. These multiple environments include a Simulation Environment 10, which receives inputs from a Plant Environment 20; and a Model and Tuning Environment 30 which receives inputs from the Simulation and Plant Environments 10, 20 and from a MPC Environment 40. The MPC Environment 40 receives inputs from the Model and Tuning Environment 30 and from the Plant Environment 20 and provides outputs to the Plant Environment 20 and to the Model and Tuning Environment 30.

The Plant Environment 20 includes regulatory control 22 to control the operation of process 24. As is well known regulatory control 22 typically comprises a process automation system that includes associated instrumentation such as sensors for measuring temperature, pressure and flow; and analyzers.

Each of the environments 10, 30 and 40 include the following multiple software components:

Simulation Environment 10
    Nonlinear simulation model 12
    Data Pretreatment 14
    Data reconciliation and parameter estimation 16
    Model change detection 18
    Linear model export 19
Model and Tuning Environment 30
    State Space Conversion 32
    Order reduction 34
    Discrete-time conversion 35
    Model Evaluation 36
    Automated MPC tuning 38
MPC Environment 40
    Model transfer smoothing 42
    State estimator and controller 44

The Simulation Environment 10 includes five components or modules: nonlinear model 12, data pretreatment 14, data reconciliation and parameter estimation 16, model change detection 18, and linear model export 19. The nonlinear model 12 is a representation of the industrial process as a set of mathematical equations (ordinary differential, partial differential, integral, and/or algebraic equations). The nonlinear model typically has the following general form:

$$f(\dot{x}(t),x(t),u(t),y(t),\theta)=0$$

$$g(x(t),u(t),y(t),\theta)=0$$

where
    t represents time,
    x(t) is the state vector,
    $\dot{x}$(t) is the time derivative of the state vector,
    u(t) is the input vector,
    y(t) is the algebraic vector,
    θ is the parameter vector,
    f defines the differential equations, and
    g defines the algebraic equations.

The plant data from the Plant Environment 20 is processed by the data pretreatment module 14, which is designed to detect and remove gross errors from the plant data. The nonlinear model 12 and the data reconciliation and parameter estimation module 16 each receive the processed plant data from module 14.

The data reconciliation and parameter estimation module 16 balances correcting sensor-based measurement errors against readjusting unmeasured disturbances (e.g. equipment attributes or feed characteristics) to provide a real-time estimate of the predicted plant behavior. This module receives measurements preprocessed (i.e. gross error removal) by module 14 from the plant instrumentation and control system (regulatory control 22 in the Plant Environment 20) and processes this information to create a better representation of the plant's performance. The data reconciliation procedure is required to correct for instrumentation errors, such as thermocouple drift, improper flowmeter calibration, etc. by altering the preprocessed measurement data. The parameter estimation procedure uses the reconciled measurement data to readjust model parameters ($\theta$) resulting from changes in unmeasured disturbances that impact model performance. The nonlinear model 12 then uses the reconciled data and new parameter estimates to estimate the values of the other plant variables.

The model parameters may represent physical properties or special properties defined for modeling purposes (e.g. heat exchange coefficients, tank mixing factors, aggregate feed composition properties, etc.). Since the parameters are closely associated with the actual process and plant equipment (as opposed to transfer function coefficients and step response coefficients) and since the data is also reconciled by module 16, this type of parameter estimation procedure generally provides more accurate on-line estimates than an adaptive, linear model identification method. The new model parameters are then passed to the nonlinear model module 12.

The model change detection module 18 evaluates the changes in the model variables, which are defined herein as parameters ($\theta$) and dynamic variables (x, y, u), and determines when a new linear model should be generated. The model change detection logic can be based on various criteria (e.g. when a single variable changes by more than a predetermined threshold or if the sum of the absolute values of all variable changes exceeds a different threshold, etc.). When the change detection module 18 determines, using one of the criteria described above, that there is a change in the model variables, it sets a flag and sends it to the nonlinear model module 12. The nonlinear module 12 then activates the linear model export module 19 to analytically generate a set of linearized model equations from the nonlinear model of module 12.

The software of the linear model export module 19 provides symbolic differentiation of the nonlinear model equations to create linearized equations in the following form:

$$\begin{bmatrix} G_1 & E_1 \\ H_1 & F_1 \end{bmatrix} \begin{bmatrix} x^*(t) \\ x(t) \end{bmatrix} + \begin{bmatrix} A_1 & B_1 \\ C_1 & D_1 \end{bmatrix} \begin{bmatrix} x(t) \\ u(t) \end{bmatrix} = \begin{bmatrix} 0 \\ 0 \end{bmatrix}$$

This set of equations is then passed to the Model and Tuning Environment 30 in a sparse matrix format.

The Model and Tuning Environment 30 includes five modules: state space conversion 32, order reduction 34, discrete-time conversion 35, model evaluation 36, and automated MPC tuning 38. The state space conversion module 32 receives the implicit linear model equations from the rigorous Simulation Environment 10. These equations are then translated by the state space conversion module 32 into a state space matrix model based on the control structure specified in the current controller model, i.e. the set of controller inputs (manipulated variables and disturbance variables) and outputs (controlled variables) received by Model and Tuning Environment 30 from MPC Environment 40. The resulting state space model has the following standard, continuous-time form:

$$\dot{x}(t) = Ax(t) + Bu(t)$$

$$y(t) = Cx(t) + Du(t)$$

The order reduction module 34 is then used to obtain an approximately equivalent state space model, in terms of state observability and controllability, with a reduced number of states. This procedure is extremely important for some practical applications as it may reduce the number of states by one or more orders of magnitude. The controller design is also simplified by reducing the number of states.

The standard technique for order reduction is to convert the state space model to a balanced realization and then truncate some of the states (commonly referred to as balance and truncate method). This method involves finding a balanced realization in which the controllability and observability grammians are equal, and the states are sorted from the most controllable and observable, to the least. The states that are much less observable and much less controllable than the others can then be eliminated (based on a specified threshold) to form the reduced order model. Alternatively, other well known order reduction methods could be used in place of the standard balance and truncate method.

It should be appreciated that the order reduction module 34 can be bypassed if desired as is shown in FIG. 1 by dotted line 33. For example, such bypassing may occur if the simulation model has small number of states; or to retain same simulation state variables in state space model.

The reduced order model is then converted to a discrete-time state space model by module 35 based on the desired sampling period, T, for the MPC. The MPC format of the model is:

$$x(k+1) = A_d x(k) + B_{out}(k) + B_{ff}d(k)$$

$$y(k) = C_d x(k) + D_{out}(k) + D_{ff}d(k)$$

where k represents the time step, x(k) is the state vector, u(k) is the manipulated variable vector, d(k) is the disturbance variable vector, and y(k) is the controlled process variable.

Alternatively, the order reduction methods may be applied to a full-order, discrete-time state space model. In this alternative procedure, which is not shown in FIG. 1, the full-order, continuous-time state space model would first be converted to a discrete-time model, and then order reduction techniques would be applied to the discrete-time model.

Following the creation of a reduced order, discrete-time state space model, the model evaluation procedure of module 36 is used to evaluate the time and frequency domain characteristics of the model. Various open-loop and closed-loop performance criteria are used to compare the new reduced order model to the new full-order model and to the existing controller model, e.g.

(O1) Compare predictions for recent operating data (starting at the time when the parameter or variable change was detected).

(O2) Compare open-loop step responses.

(O3) Compare open-loop frequency responses.

(C1) Compare closed-loop step responses.

(C2) Compare closed-loop frequency responses.

The model evaluation logic can assume one of various forms. For example, compute a weighted sum of the open-loop performance criteria (O1, O2, and O3) and compare to a specified open-loop limit. If the weighted open-loop performance measure is less than the open-loop limit, then the reduced order model is rejected and a new reduced order model is calculated by the order reduction module 34. The open-loop performance measure of this new reduced order model is then evaluated.

If the weighted open-loop performance measure exceeds the open-loop limit, then proceed to compute a weighted sum of the closed-loop performance criteria (C1, C2) using the existing MPC tuning specifications and compare this to a closed-loop limit. If the weighted closed-loop performance measure exceeds the closed-loop limit, then the new reduced order model is accepted and passed to the MPC Environment 40 (with the existing MPC tuning specs).

However, if the weighted closed-loop performance measure is less than the closed-loop limit, then the automated MPC tuning procedure in module 38 is invoked to define new controller tuning specifications for this model.

The automated tuning module 38 tries to find new tuning specifications for the MPC state estimator and controller 44. Various tuning methods can be used. For example, one method is to find new tuning specifications that improve the closed-loop performance measure of the new model while matching tuning speed factors of the current model. The tuning speed factors are calculated for each controlled variable based on the closed-loop speed of response relative to the open-loop speed of response using predetermined typical manipulated variable moves. As a first step, this module reads information from the MPC Environment 40 regarding the current model and tuning specifications, including the tuning speed factors. The automated tuning module 38 then performs an iterative search to find the tuning specifications for the new model that maximize the weighted closed-loop performance measure while maintaining the same tuning speed factors as in the existing model.

Thus, in the Model and Tuning Environment 30, it is possible to have iterations between the order reduction 34, model evaluation 36, and automated MPC tuning 38 modules. When the iterations are complete, a new model and possibly new tuning specifications are passed to the MPC Environment 40. If the number of iterations reaches a predetermined limit, then the iterations cease without passing a new model to the MPC Environment 40.

It is also possible to use a simplified procedure for on-line model evaluation in order to reduce the computation time (e.g. just use performance measure O1, or O1 and C1). In that case, the off-line model evaluation procedure may be more complicated (such as the one described above) and the results may be used to help define the simplified on-line procedure (e.g. find appropriate thresholds for O1 and C1).

Whenever a new model and tuning specifications are accepted by the model evaluation module 36, the MPC Environment 40 receives the new model and tuning specifications. This information can either be automatically downloaded to the MPC 44, or presented to an operator/engineer for approval prior to download. After a new model is downloaded to the MPC 44, the model transfer smoothing module 42 is invoked to smooth the transfer between the two models In one embodiment of the present invention, the MPC controller was embodied by an AdvaControl 3dMPC available from ABB. This controller is described in Sweden patent application serial number 9903592-5, the disclosure of which is expressly incorporated herein by reference. In such an embodiment, the model transfer smoothing module uses the observer or state estimator tuning specifications passed from the Model and Tuning Environment 30 to calculate a new gain vector for the state estimator of the new model and then uses past operating data to smooth its initialization. The MPC state estimator updates the estimates of the states based on linear model predictions and current operating data.

In this embodiment of the present invention the MPC controller uses the state estimates and finds the optimal solution to a control problem of minimizing a weighted sum of manipulated variable moves plus controlled variable deviations from setpoints, and violations of constraints. The control problem also includes hard absolute and rate of change constraints for the manipulated variables. A move horizon is defined for each manipulated variable and a prediction horizon is defined for each controlled variable. The MPC solution defines the proposed moves for each manipulated variable during its move horizon. For each manipulated variable, the first calculated move is added to its current value and then sent to the plant environment to be implemented in the regulatory control module 22. The manipulated variable values represent new targets for the regulatory controllers (usually PID controller setpoints) or outputs to actuators. These regulatory control changes affect the process, then new data is sent to each of the other three environments (Simulation 10, Model and Tuning 30, and MPC 40), and the entire procedure is repeated.

Figure 2:
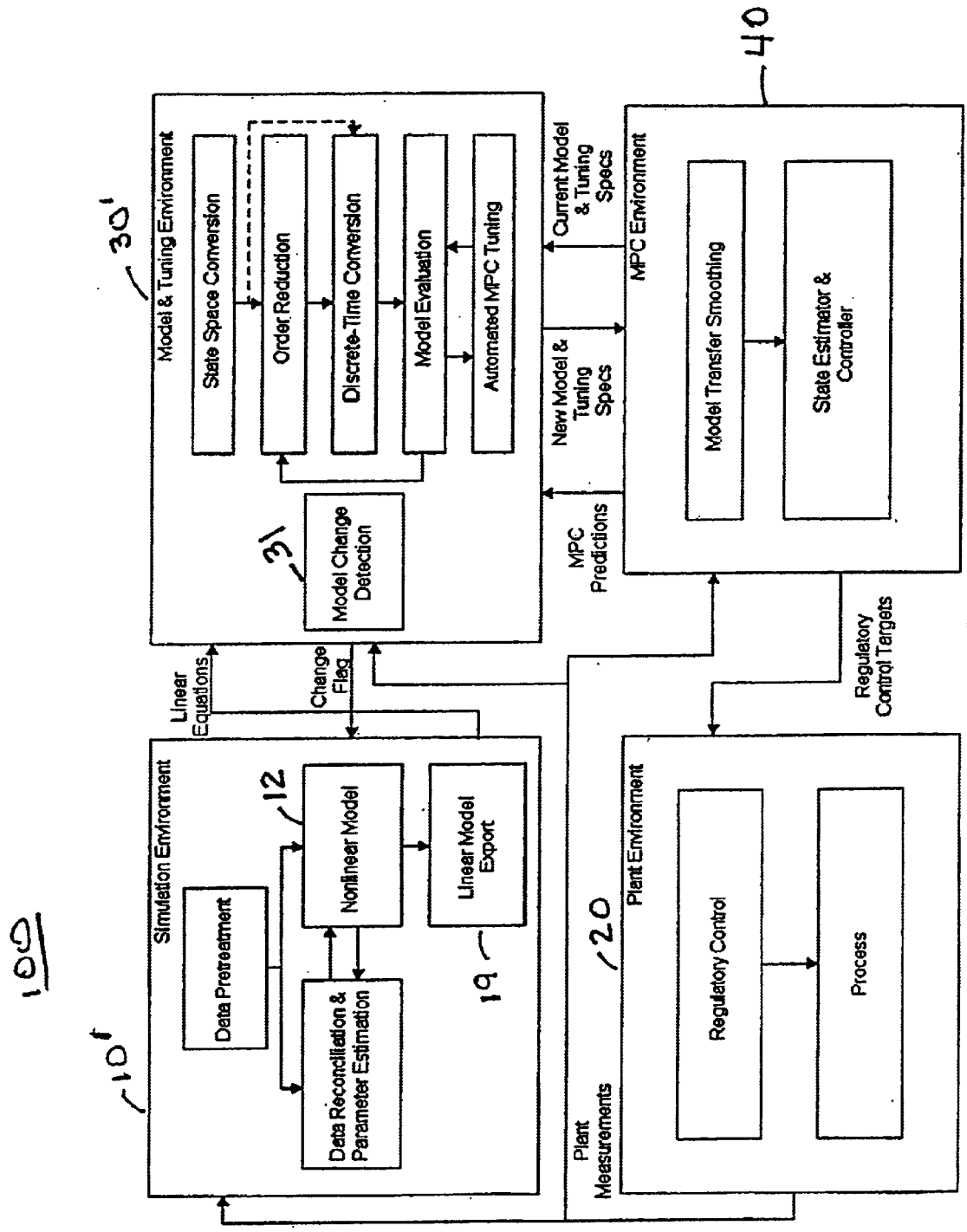
FIG. 2 shows a variation of the embodiment of FIG. 1 in which the model change detection module is part of the Model and Tuning Environment.

FIG. 2 shows a variation 100 of the preferred embodiment of FIG. 1 in which the model change detection module 18 of the Simulation Environment 10 of FIG. 1 is now included as module 31 in the Model and Tuning Environment 30' of FIG. 2. In this representation, the model change detection module 31 either receives model predictions from the MPC Environment 40 and compares these to the measurement data from the Plant Environment 20 to determine the model prediction errors or depending on the type of MPC receives the prediction errors directly from the MPC.

The model change detection module 31 then evaluates the model prediction errors and determines when a new linear model should be generated. The change detection logic of module 31 can be based on various criteria (e.g. when a single prediction error exceeds a predetermined threshold or the sum of the absolute values of all prediction errors exceeds a different threshold). When the change detection logic determines that there is significant model error, it sets a flag and sends it to the Simulation Environment 10'.

The linear model export module 19 of the Simulation Environment 10' then provides linearized equations of the nonlinear model of module 12 to the state space conversion module 32 of the Model and Tuning Environment 30'. Other than this distinction, the remaining modules function as described in the preferred embodiment and have reference numerals which are identical to those used in FIG. 1.

Figure 3:
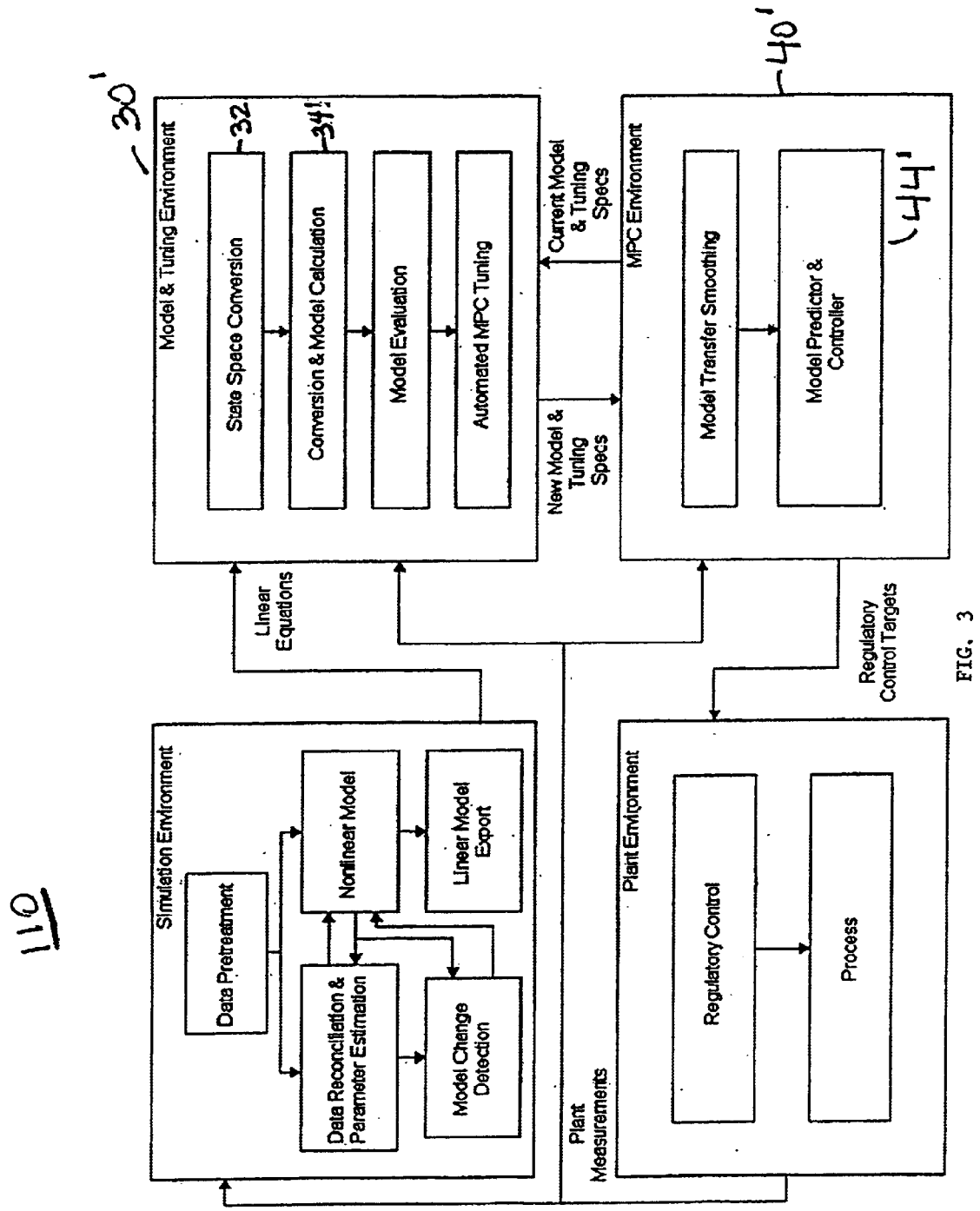
FIG. 3 shows a variation of the embodiment of FIG. 1 using a different type of MPC controller, i.e. not a state space MPC controller.

FIG. 3 shows a variation 110 of the preferred embodiment of FIG. 1 using a non-state space MPC wherein the environments and modules that are the same as those in FIG. 1 have reference numerals which are identical to those used in FIG. 1 for those environments and modules. The MPC Environment 40' of FIG. 3 includes a model predictor and controller 44' instead of the state estimator and controller 44 shown in the embodiment of FIG. 1. The Model and Tuning Environment 30' has a conversion and model calculation module 34' that replaces the order reduction and discrete-time conversion modules 34, 35 of the embodiment of FIG. 1. The conversion and model calculation module 34' includes a transformation of the full order continuous-time state space model provided by the state space conversion module 32 to a discrete-time model, and the calculation of the model parameters in their corresponding MPC format.

In a further variation, not shown in FIG. 3, the conversion and model calculation module 34' could transform a reduced order state space model provided by the order reduction module 34 of FIG. 1 to a discrete-time model (instead of converting the full order state space model). Another variation, also not shown in FIG. 3, is to add a module that reduces the complexity of the model generated by the conversion and model calculation module 34'. For example, a module could be added to reduce the order of a transfer function matrix representation of the model.

A further variation, also not shown in FIG. 3, is to first reduce the complexity of the linear model and then convert it to the MPC format required to update the MPC model. For example, it is possible to only extract the linearized steady-state (DC) gains from the rigorous nonlinear simulation model and then apply only these gains (without changes in the dynamics) to the MPC model. If the new model results from any of the procedures using the various embodiments for the conversion and calculation module 34' described above in connection with FIG. 3, that model is referred to as a simplified MPC format model.

Figure 4:
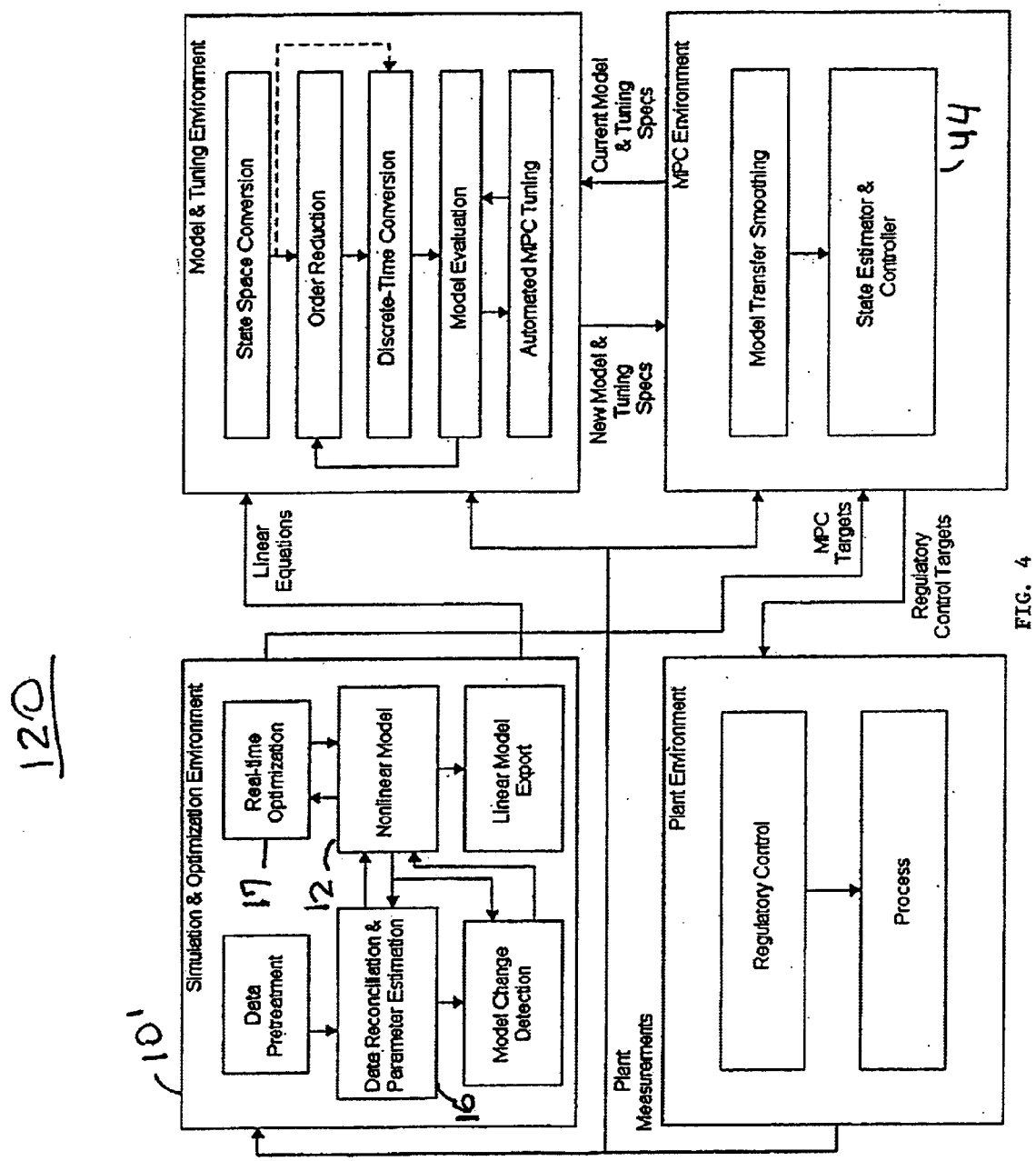
FIG. 4 shows an extension of the embodiment of FIG. 1 that includes the described methodology together with a real-time optimization module in the Simulation and Optimization Environment.

FIG. 4 shows an extension 120 of the preferred embodiment of FIG. 1 to also include a real-time optimization module 17 in the modified Simulation and Optimization environment 10'. The environments and modules in FIG. 4 that are the same as those in FIG. 1 have reference numerals which are identical to those used in FIG. 1 for the corresponding environments and modules.

The real-time optimization module 17 of FIG. 4 uses the rigorous, nonlinear process model data from module 12 (the data could be read from a shared memory location) This model data is reconciled and includes updated model parameters from module 16.

The real-time optimization module 17 then solves for the values of the optimization variables that optimize its objective function (e.g. to minimize operating costs). The output data of the real-time optimization module 17 typically represents targets for the MPC controller (e.g. steady-state targets for some or all of the manipulated variables and setpoint targets for some or all of the controlled variables). This data is passed to the state estimator and controller 44 of the MPC Environment 40 for implementation. The output data of the real-time optimization module 17 is also passed to the nonlinear model 12 within the Simulation and Optimization Environment 10'. Alternatively, the output of module 17 could be passed to a memory location that is shared with the nonlinear model 12.

Depending on the required and available hardware resources, the optimization extension of the preferred embodiment may include a separate Optimization Environment, not shown in FIG. 4, for the real-time optimization module 17. In this case, the Optimization Environment would communicate with the Simulation Environment to utilize the same rigorous, nonlinear model data. The real-time optimization module 17 would send its output to both the MPC Environment and to the Simulation Environment.

Figure 5:
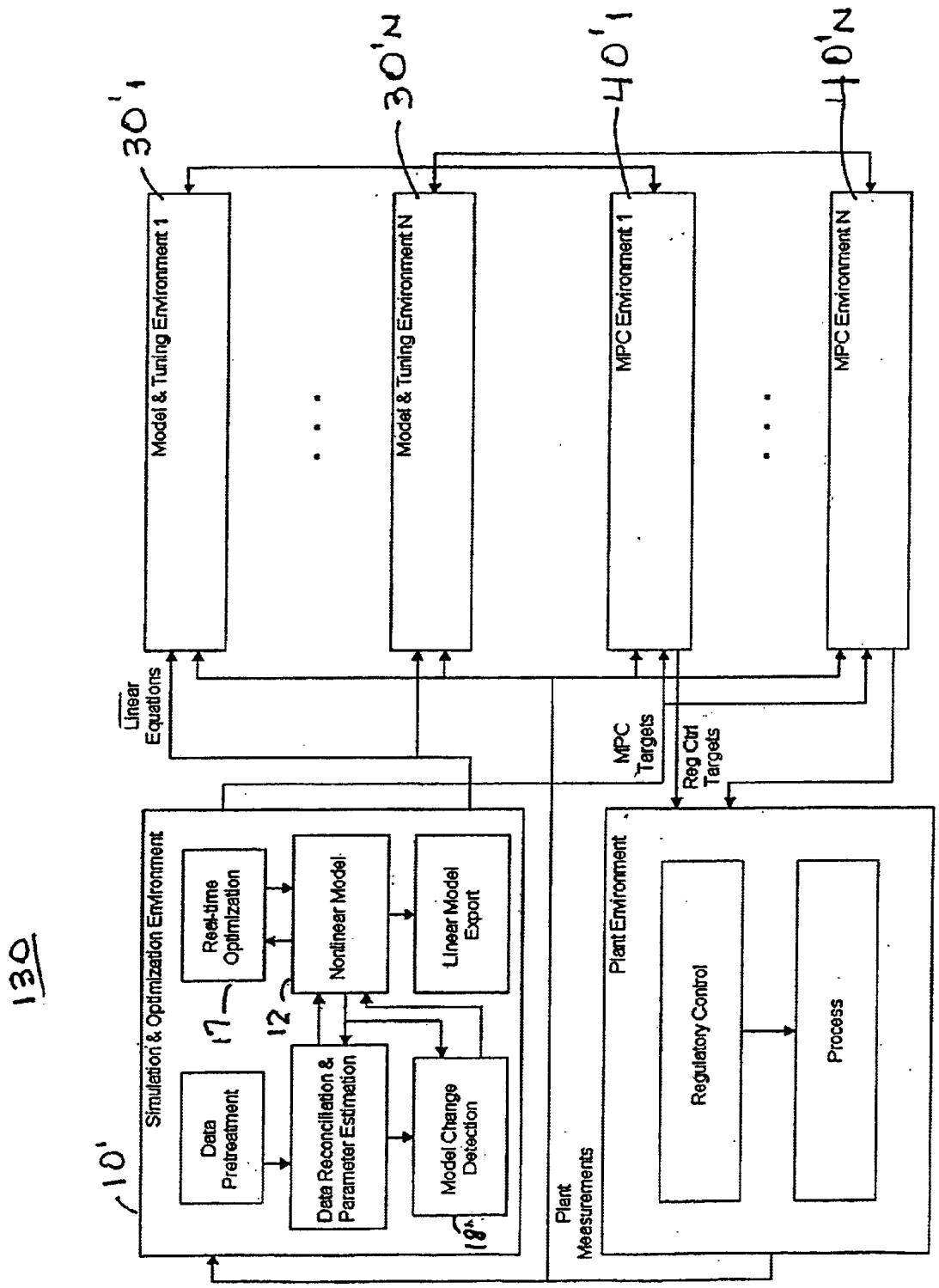
FIG. 5 shows an extension of the embodiment of FIG. 1 similar to FIG. 4 with a real-time optimization module that is setting targets for multiple MPCs, so there are multiple MPC Environments and multiple Model and Tuning Environments.

FIG. 5 shows a modified version 130 of FIG. 4 in which the nonlinear model 12 and the real-time optimization module 17 of the Simulation and Optimization Environment 10' communicate with multiple MPC Environments 40' and multiple Model and Tuning Environments 30'. In this embodiment, there is a single nonlinear model 12 representing the complete plant and a single real-time optimization module 17. However, there can be more than one MPC, each MPC associated with a section of the complete plant model (i.e. a submodel). Each MPC uses a model representing the corresponding plant submodel to control this portion of the plant. Thus, if there are N MPCs, then as is shown in FIG. 5, the MPC Environment 40' comprises 1 to N such environments and the Model and Tuning Environment 30' also comprises 1 to N such environments, each of the 1 to N Environments 30', 40' associated with a respective one of the N MPCs. The optimization module 17 provides targets for some or all of the N MPC controllers.

The model change detection module 18' of the Simulation and Optimization Environment 10' determines when there is a significant change in one or more of the N submodels. When this occurs, the model change detection module 18' sets flags for each of the N submodels in which there are significant changes. The linear model export module 19' then provides new linearized submodel equations to each of the N Model and Tuning Environments 30' whose corresponding change detection flag is set.

In another variation not shown in FIG. 5, there could, as is shown in FIG. 2, be a model change detection module 31' in each Model and Tuning Environment 30' instead of having a single model change detection module in the Simulation and Optimization Environment 10'. In this variation, each model change detection module determines when to generate a new linear submodel for its corresponding MPC.

Figure 6:
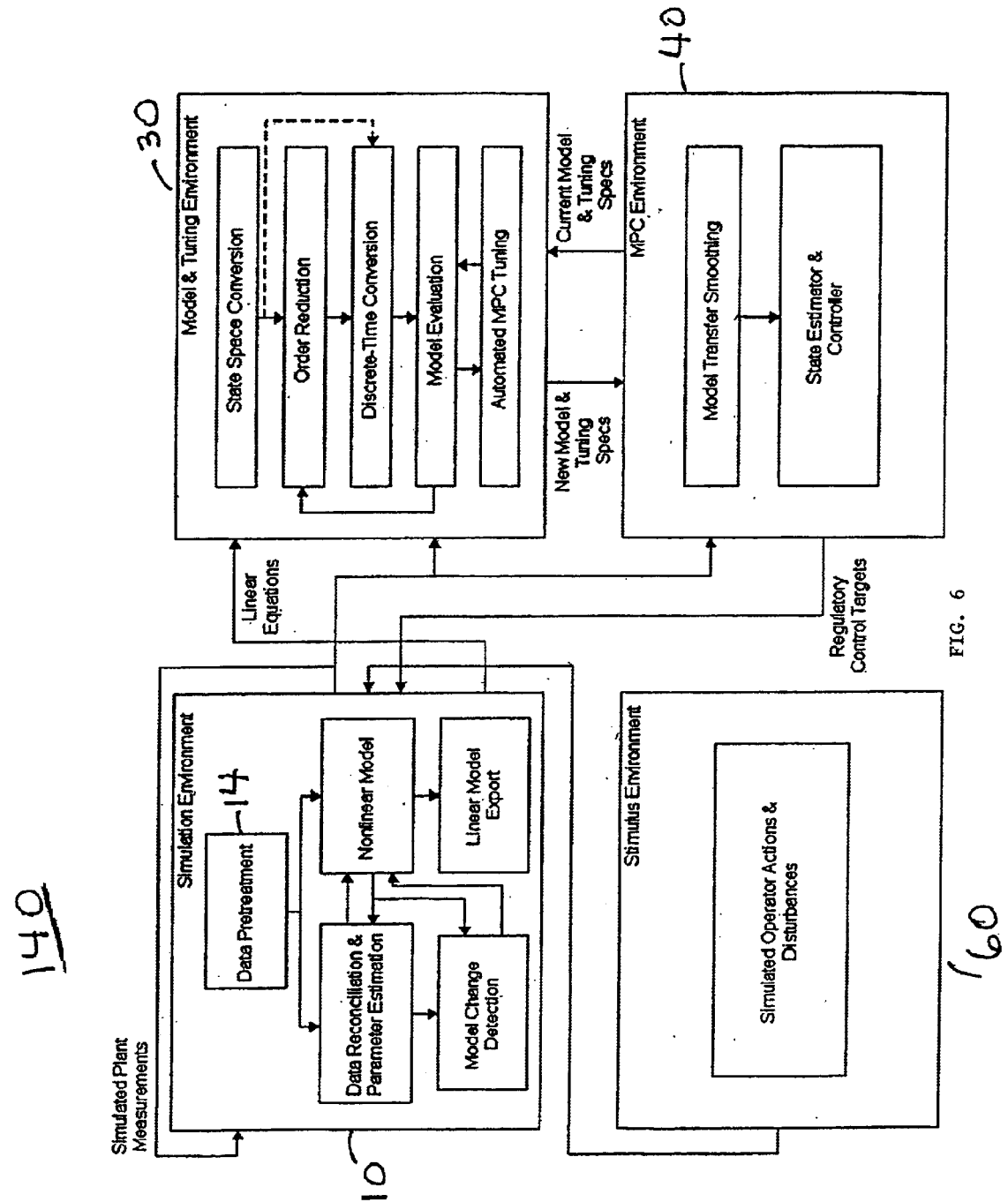
FIG. 6 shows a variation of the embodiment of FIG. 1 used for off-line design of an adaptive, linear MPC based on a rigorous, nonlinear model.

FIG. 6 shows a variation 160 of the embodiment of FIG. 1 used for off-line design of an adaptive, linear MPC based on a rigorous, nonlinear model. In this embodiment, the Plant Environment 20 of FIG. 1 is replaced by a Stimulus Environment 60 which provides the simulated operator actions and process disturbances. The term "simulation stimuli" is used herein to refer to the simulated operator actions and process disturbances. The simulation stimuli can be generated automatically from a pre-determined event file or randomly from an event generator, or spontaneously from the user or can be generated from any combination of the foregoing sources. The simulation stimuli is sent to the nonlinear model 12 of the Simulation Environment 10. The nonlinear model 12 provides simulated plant measurement data for the data pretreatment module 14 and for the Model and Tuning Environment 30 and the MPC Environment 40. The MPC Controller 44 provides targets for the regulatory controllers which are simulated within the nonlinear model 12. The remaining modules and data transfers between modules function in exactly the same manner as in the embodiment of FIG. 1.

It is to be understood that the description of the preferred embodiments) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for controlling a process comprising:
   a) receiving plant measurement variables from a regulatory control system;
   b) applying said plant measurement variables to update one or more variables of a nonlinear model;
   c) linearizing said updated nonlinear model when a change in said one or more of said model variables has exceeded an associated predetermined threshold; and
   d) passing a MPC format model converted from said linearized model to a model predictive controller.

2. A method for controlling a process comprising:
   a) receiving plant measurement variables from a regulatory control system;

b) applying said plant measurement variables to update one or more variables of a nonlinear model;
c) linearizing said updated nonlinear model; and
d) passing a MPC format model converted from said linearized model to a model predictive controller,
said updated nonlinear model linearized when one or more model prediction errors in said MPC format model currently operational in said model predictive controller has exceeded an associated predetermined threshold.

3. A method for controlling a process comprising:
a) applying simulation stimuli to update one or more variables of a nonlinear model comprising:
  (i) pretreating said simulation stimuli;
  (ii) reconciling said pretreated simulation stimuli; and
  (iii) using said reconciled and pretreated simulation stimuli to update said nonlinear model;
b) linearizing said updated nonlinear model when a change in said one or more of said model variables has exceeded an associated predetermined threshold;
c) converting said linearized model to a full order state space model;
d) creating from said full order state space model a state space model having fewer states than said full order state space model;
e) converting said fewer states state space model to a MPC format model; and
f) evaluating the performance of said MPC format model with the tuning for a presently existing model of said process in a model predictive controller versus the performance of said presently existing model with said tuning and either:
  passing said MPC format model with said presently existing model tuning to a model predictive controller when said performance evaluation of said MPC format model exceeds a first predetermined limit; or
  computing new tuning for said MPC format model when said performance evaluation falls below said first predetermined limit and repeating said evaluations; or
  returning said MPC format model to said creating a MPC format model having fewer states than said full order state space model to change the number of states in said MPC format model when said performance of said MPC format model falls below said first predetermined limit.

4. A method for controlling a process comprising:
a) applying simulation stimuli to update one or more variables of a nonlinear model comprising:
  (i) pretreating said simulation stimuli;
  (ii) reconciling said pretreated simulation stimuli; and
  (iii) using said reconciled and pretreated simulation stimuli to update said nonlinear model;
b) linearizing said updated nonlinear model when a change in said one or more model prediction errors in a MPC format model currently operational in a model predictive controller has exceeded an associated predetermined threshold;
c) converting said linearized model to a full order state space model;
d) creating from said full order state space model a state space model having fewer states than said full order state space model;
e) converting said fewer states state space model to a MPC format model; and
f) evaluating the performance of said MPC format model with the tuning for a presently existing model of said process in a model predictive controller versus the performance of said presently existing model with said tuning and either:
  passing said MPC format model with said presently existing model tuning to a model predictive controller when said performance evaluation of said MPC format model exceeds a first predetermined limit; or
  computing new tuning for said MPC format model when said performance evaluation falls below said first predetermined limit and repeating said evaluations; or
  returning said MPC format model to said creating a MPC format model having fewer states than said full order state space model to change the number of states in said MPC format model when said performance of said MPC format model falls below said first predetermined limit.

5. A method for controlling a process comprising:
a) applying simulation stimuli to update one or more variables of a nonlinear model comprising:
  (i) pretreating said simulation stimuli;
  (ii) reconciling said pretreated simulation stimuli; and
  (iii) using said reconciled and pretreated simulation stimuli to update said nonlinear model;
b) linearizing said updated nonlinear model when a change in said one or more of said model variables has exceeded an associated predetermined threshold;
c) converting said linearized model to a MPC format model; and
d) passing said MPC format model to a model predictive controller comprising:
  evaluating the performance of said MPC format model with the tuning for a presently existing model of said process in a model predictive controller versus the performance of said presently existing model with said tuning and either:
    passing said MPC format model with said presently existing model tuning to a model predictive controller when said performance evaluation of said MPC format model exceeds a first predetermined limit; or
    computing new tuning for said MPC format model when said performance evaluation falls below said first predetermined limit and repeating said evaluations.

6. A method for controlling a process comprising:
a) applying simulation stimuli to update one or more variables of a nonlinear model comprising:
  (i) pretreating said simulation stimuli;
  (ii) reconciling said pretreated simulation stimuli; and
  (iii) using said reconciled and pretreated simulation stimuli to update said nonlinear model;
b) linearizing said updated nonlinear model when a change in said one or more model prediction errors in a MPC format model currently operational in a model predictive controller has exceeded an associated predetermined threshold;
c) converting said linearized model to a MPC format model; and
d) passing said MPC format model converted from said linearized model to a model predictive controller comprising:
  evaluating the performance of said MPC format model with the tuning for a presently existing model of said process in said model predictive controller versus the performance of said presently existing model with said tuning and either:

passing said MPC format model with said presently existing model tuning to a model predictive controller when said performance evaluation of said MPC format model exceeds a first predetermined limit; or computing new tuning for said MPC format submodel when said performance evaluation falls below said first predetermined limit and repeating said evaluations.

7. A method for controlling a process comprising:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in said one or more of said updated submodel variables has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers;

h) converting said at least one linearized submodel to a full order state space submodel;

i) creating from said full order state space submodel a state space submodel having fewer states than said full order state space submodel;

j) converting said fewer states state space submodel to a MPC format submodel; and k) evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluations; or returning said MPC format submodel to said creating a MPC format submodel having fewer states than said full order state space submodel to change the number of states in said MPC format submodel when said performance of said MPC format submodel falls below said first predetermined limit.

8. A method for controlling a process comprising:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in one or more model prediction errors in an associated one of one or more MPC format submodels currently operational in an associated one of said two or more model predictive controllers has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers; and h) converting said at least one linearized submodel to a full order state space submodel;

i) creating from said full order state space submodel a state space submodel having fewer states than said full order state space submodel;

j) converting said fewer states state space submodel to said MPC format submodel; and k) evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluations; or returning said MPC format submodel to said creating a MPC format submodel having fewer states than said full order state space submodel to change the number of states in said MPC format submodel when said performance of said MPC format submodel falls below said first predetermined limit.

9. A method for controlling a process comprising:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in said one or more of said updated submodel variables has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers; and h) passing said linear model to said associated one of said two or more controllers comprising:

evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluating.

10. A method for controlling a process comprising:

a) receiving plant measurement variables from a regulatory control system;

b) pretreating said plant measurement variables;

c) reconciling said pretreated plant measurement variables;

d) using said reconciled and pretreated plant measurement variables to update one or more variables of each submodel of a nonlinear model, said nonlinear model having two or more of said submodels, each of said two or more submodels having a predetermined one of two or more model predictive controllers associated therewith;

e) converting at least one updated submodel of said updated nonlinear model to a linear submodel when a change in one or more model prediction errors in an associated one of one or more MPC format submodels currently operational in an associated one of said two or more model predictive controllers has exceeded a predetermined threshold, said linear submodel for operating said associated one of said two or more controllers;

f) using said nonlinear model in a real time optimizer to compute targets for all of said two or more model predictive controllers, a predetermined subset of said computed targets associated with a respective one of said two or more controllers;

g) passing each of said predetermined subsets of said computed targets associated with a respective one of said two or more model predictive controllers to said associated one of said two or more controllers; and h) passing said linear model to said associated one of said two or more controllers comprising:

evaluating the performance of said MPC format submodel with the tuning for a presently existing submodel of said process in said associated one of said two or more model predictive controllers versus the performance of said presently existing submodel with said tuning and either:

passing said MPC format submodel with said presently existing submodel tuning to said associated one of said two or more model predictive controllers when said performance evaluation of said MPC format submodel exceeds a first predetermined limit; or computing new tuning for said MPC format submodel when said performance evaluation of said MPC format submodel falls below said first predetermined limit and repeating said evaluating.

* * * * *